United States Patent
Eitel (10) Patent No.: US 7,043,521 B2
(45) Date of Patent: May 9, 2006

(54) SEARCH AGENT FOR SEARCHING THE INTERNET

(75) Inventor: Robert T. Eitel, Bartlett, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 714 days.

(21) Appl. No.: 10/103,479

(22) Filed: Mar. 21, 2002

(65) Prior Publication Data

US 2003/0217097 A1    Nov. 20, 2003

(51) Int. Cl.
*G06F 15/16* (2006.01)
*G06F 7/00* (2006.01)

(52) U.S. Cl. .................. 709/202; 709/219; 707/3; 707/10

(58) Field of Classification Search ........... 709/200, 709/202, 203, 225, 226, 229; 707/1, 3, 10
See application file for complete search history.

(56) References Cited

U.S. PATENT DOCUMENTS

| | | | | |
|---|---|---|---|---|
| 5,953,718 | A * | 9/1999 | Wical | 707/5 |
| 6,098,064 | A * | 8/2000 | Pirolli et al. | 707/2 |
| 6,192,354 | B1 * | 2/2001 | Bigus et al. | 706/46 |
| 6,282,567 | B1 * | 8/2001 | Finch et al. | 709/219 |
| 6,321,228 | B1 * | 11/2001 | Crandall et al. | 707/10 |
| 6,336,117 | B1 * | 1/2002 | Massarani | 707/100 |
| 6,389,467 | B1 * | 5/2002 | Eyal | 709/223 |
| 6,438,539 | B1 * | 8/2002 | Korolev et al. | 707/3 |
| 6,473,756 | B1 * | 10/2002 | Ballard | 707/6 |
| 6,523,023 | B1 * | 2/2003 | Sonnenberg | 707/3 |
| 6,598,072 | B1 * | 7/2003 | McBrearty et al. | 709/203 |
| 6,654,735 | B1 * | 11/2003 | Eichstaedt et al. | 707/3 |
| 6,671,681 | B1 * | 12/2003 | Emens et al. | 707/5 |
| 6,691,106 | B1 * | 2/2004 | Sathyanarayan | 707/3 |
| 6,718,324 | B1 * | 4/2004 | Edlund et al. | 707/5 |
| 6,772,150 | B1 * | 8/2004 | Whitman et al. | 707/6 |
| 6,778,505 | B1 * | 8/2004 | Bullman et al. | 370/254 |
| 6,785,671 | B1 * | 8/2004 | Bailey et al. | 707/3 |
| 6,785,688 | B1 * | 8/2004 | Abajian et al. | 707/102 |
| 6,789,076 | B1 * | 9/2004 | Dutta | 707/5 |
| 6,832,218 | B1 * | 12/2004 | Emens et al. | 707/3 |
| 6,854,009 | B1 * | 2/2005 | Hughes | 709/220 |
| 6,877,002 | B1 * | 4/2005 | Prince | 707/5 |
| 6,981,040 | B1 * | 12/2005 | Konig et al. | 709/224 |
| 2003/0037097 | A1 * | 2/2003 | Meyer et al. | 709/202 |

OTHER PUBLICATIONS

Blue Squirrel. "WebWhacker 3.0 Referance Manual". ForeFront, INC. 1995-1996.*

* cited by examiner

*Primary Examiner*—Saleh Najjar
*Assistant Examiner*—Asad Muhammad Nawaz
(74) *Attorney, Agent, or Firm*—Welsh & Katz, Ltd.

(57) ABSTRACT

A method and apparatus are provided for obtaining information over the internet. The method includes the steps of uploading a search agent from a searching terminal to a website to be searched and executing the uploaded steps of the search agent at the website to provide a search result. The method further includes the step of downloading the search result to the searching terminal.

41 Claims, 4 Drawing Sheets

SEARCH AGENT FOR SEARCHING THE INTERNET

FIELD OF THE INVENTION

The field of the invention relates to the internet and more particularly to methods for obtaining information over the internet.

BACKGROUND OF THE INVENTION

Methods of searching the internet are known. Initially, a searcher downloads a browser onto his computer. Through the browser, the searcher is able to enter search terms and search websites worldwide.

Upon identifying a website and transmitting a query to the website, the website downloads a webpage to the searcher. The webpage typically provides a windows type environment where a searcher may select from among a series of options to obtain further information. The searcher may select an option by activating one of a number of selectable icons displayed on the webpage.

To identify a website, the searcher may first access a search engine (e.g., Yahoo, WebCrawler, etc.). The searcher may access the selected search engine by entering a website address of the particular search engine, or the internet searcher may automatically be connected to the search engine upon start-up.

Upon establishing a link to the search engine (also a website), the search engine downloads a webpage to the searcher. In addition to other options available by icon selection, the webpage of the search engine also typically includes a character entry window within which the searcher can enter search terms.

After entry of a search term (or terms), the searcher selects a "search" icon. In response, the search term(s) are transmitted back to the search engine which, in turn, searches a database for data sources (i.e., websites) which may have information related to the search term(s). Upon locating any websites that may have information related to the search term(s), the search engine downloads a search results webpage to the searcher.

The search results webpage presents a list of sources that the search engine identifies as possibly having information which relates to the search term entered by the searcher. The search results webpage also provides an icon beside each identified data source. Activation of a selected icon beside any of the identified sources takes the searcher to a selected website based upon a hyperlink downloaded with the search results webpage.

Upon arriving at the selected website, a homepage of the website is presented to the searcher. The homepage of the selected website may present the searcher with a set of options, or in some cases, may present another data entry window for entry of further search terms.

By selection of an icon or entry of further search terms, the process may continue. Ultimately, the searcher may find the information which he is seeking. Often when a visit to a website proves unproductive, the searcher must go back. Many blind alleys may present themselves to a searcher before the searcher finds the sought-for information.

While searching for information over the internet is effective, it is often slow and tedious. Often the searcher may visit a number of websites and enter the same search terms at each site. A great deal of delay is often experienced in downloading search results and entering new search limiters. Accordingly, a need exists for a means of expediting web searching that does not require the direct control of a searcher.

SUMMARY

A method and apparatus are provided for obtaining information over the internet. The method includes the steps of uploading a search agent from a searching terminal to a website to be searched and executing the uploaded steps of the search agent at the website to provide a search result. The method further includes the step of downloading the search result to the searching terminal.

DETAILED DESCRIPTION OF AN EMBODIMENT

Figure 1:
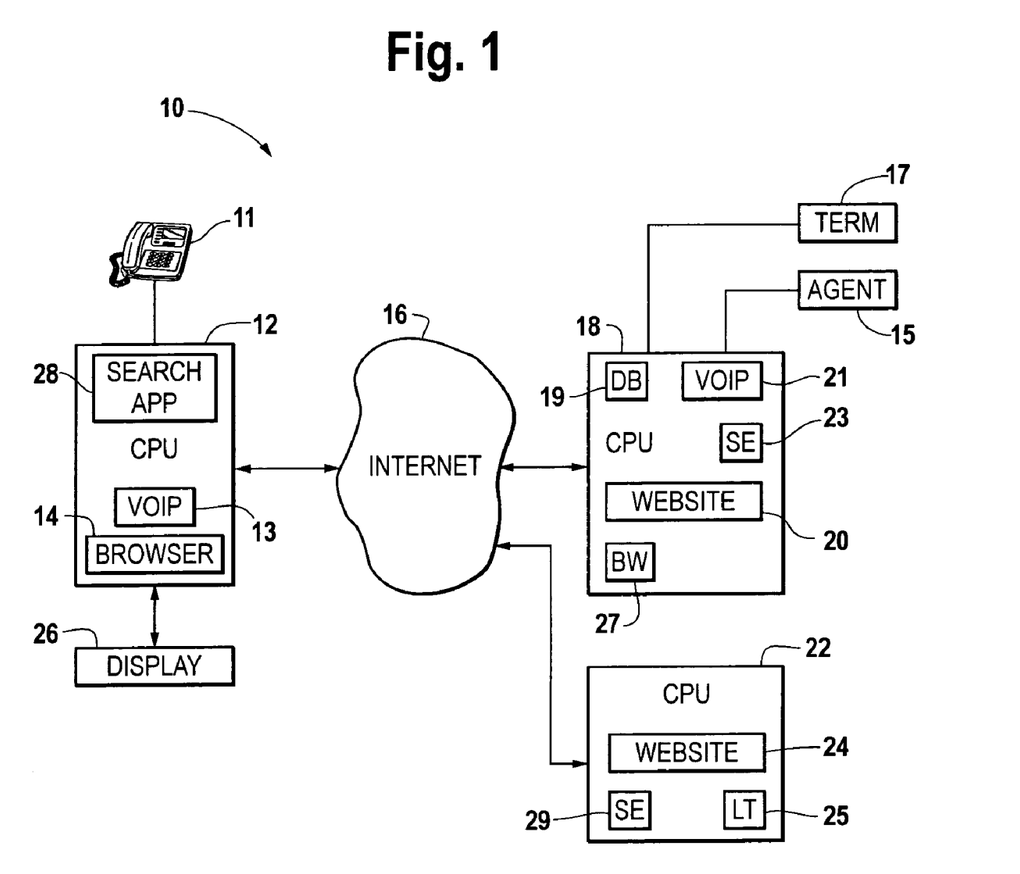
FIG. 1 depicts an internet searching system which uses a search agent in accordance with an embodiment of the invention.

FIG. 1 depicts a block diagram of a web searching system under an embodiment of the invention. Under the embodiment, a terminal (CPU) 12 may be used by a searcher to gain access to the internet for purposes of information searching. The searcher may gain access to the internet either by direct access or through any appropriate internet gateway (e.g., America On-Line (AOL), etc.). Information may be recovered by the searcher from websites 20, 24 which may operate from within any of a number of remotely located CPUs 18, 22.

The searching CPU 12 may be any appropriate DOS or Windows-based system using any appropriate browser (e.g., provided by NetScape, Inc.). The CPU 12 may also include a voice internet protocol (VOIP) application allowing for the exchange of voice and data traffic over the internet. The VOIP application 13 within the CPU 12 may be used to provide a voice plug within the CPU 12 which may be addressed by VOIP applications located at other locations (e.g., a VOIP application 21 operating from remote CPU 18). The VOIP application may be any of a number of commercially available internet products (e.g., WebPhone by NetSpeak, WebTalk by Quarterdeck, Intercom by Telescape, NetPhone by Electric Magic Global Phone by Internet, etc.).

The remote CPUs 18, 22 may be similarly provisioned with DOS or Windows applications. Internet access may be provided to the CPUs 18, 22 either directly through an appropriate T1 connection or through a nearby gateway. CPUs 18, 22 may by maintained by any of a number of public or private organizations as information resource websites 20, 24. Under one embodiment, websites 20, 24 may be maintained as commercial sites for marketing products over the internet. As with the searching CPU 12, the remote CPUs 18, 22 may be provided with VOIP applications.

Under the embodiment, a searcher may locate and access information from the remote websites 20, 24 manually (as under the prior art) or through use of a search agent transferred from the searcher's CPU 12 to the remote website 20, 24. The searcher may construct the search agent 30 (FIG. 4) and transmit it to the remote website 20, 24 as part of a search request. The search agent 30 may take many different forms, but in one of its embodiments, may include a number of search vectors. As used herein, a search vector is defined to include one or more search terms and one or more defining attributes (and/or contexts) of the search term(s). An attribute may be any feature of a search term which may be used to limit or further define the search term. A context may also be an attribute of the search term, but which is defined as a physical or intellectual environment which imparts further meaning to a search term.

Figure 4:
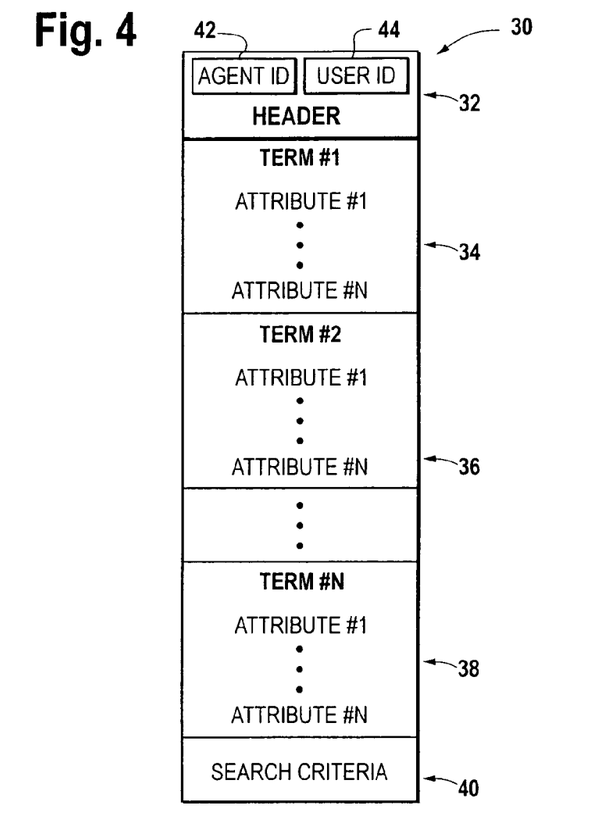
FIG. 4 depicts the search agent of FIG. 1.

Under the embodiment, the search agent 30 may be implemented in any appropriate portable software language (e.g., JAVA by SUN Microsystems, etc.). The implementing software may be included as part of the search agent, or may be resident at the searched website and invoked by features of the search agent.

Figure 5:
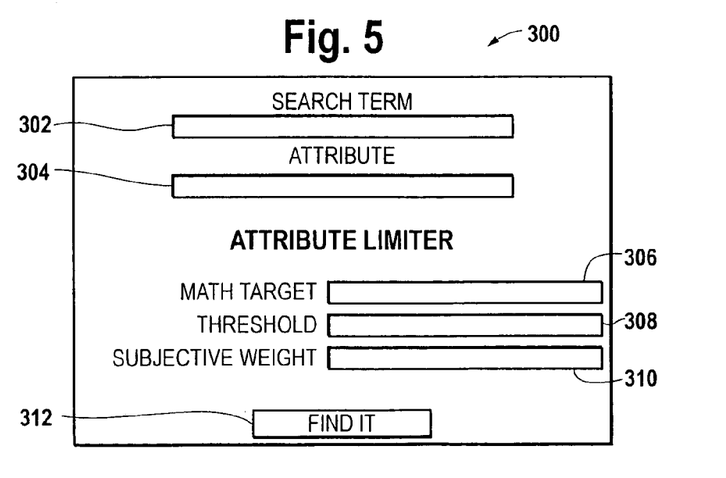
FIG. 5 depicts a window used in creating the search agent of FIG. 1.

To create a search agent 30, a searcher may first activate a search application 28 in a CPU 12. The search application 28 may present a window 300 (FIG. 5) on a display 26 of the CPU 12 to facilitate entry of information and for defining the search agent 30. Creation of the search agent 30 may be accomplished through the entry of search terms and attributes of the search terms.

Figure 2:
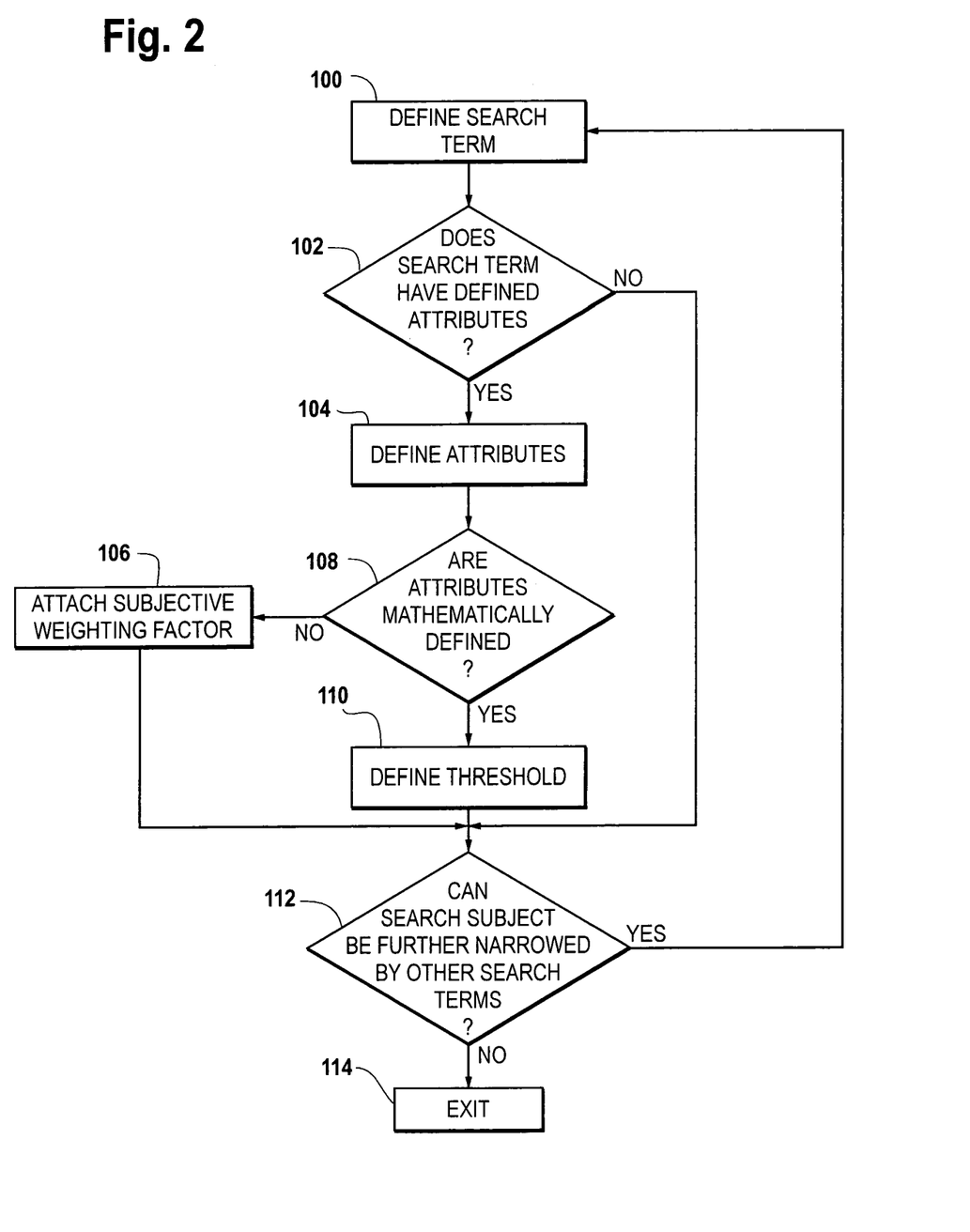
FIG. 2 depicts a flow chart for creating the search agent of FIG. 1.

FIG. 2 is a flow chart detailing a set of steps which may be followed in the creation of a search agent 30. Reference will be made to FIG. 2 as appropriate to an understanding of the invention.

As a first step in the creation of a search agent 30, a searcher may first define 100 a search term. The searcher may define a search term to the CPU 12 by entry of the search term in a data field 302 of the window 300 of FIG. 5. The search term may be a proper name for the searched subject or any term which may be descriptive or suggestive of the searched subject. For example, a searcher searching the internet for airline tickets may simply enter the search term "airline tickets", "plane tickets" or simply "tickets". Alternatively, the searcher may enter the search term in sentence form (e.g., "I want airline tickets".).

The searcher may also determine 102 whether the search term has attributes which may be used as an aid in limiting the search. Alternatively, the CPU 12 may prompt the searcher for a context of the search. Attributes may be used to further define and limit the search term by identifying information that may be contained within files identified by the search term. Attributes may be defined 104 by words or numbers associated with the searched term. In the example of the airline tickets, the originating city or destination city are both attributes of the ticket. Non-stop may be another attribute of a search term. Price would certainly be an attribute of the airline ticket.

Alternatively, the searcher may enter "Where is my hotel room?" as a query. The CPU 12 may parse the query for search terms. The CPU 12 may identify "hotel" as the search term and (by reference to a list of indefinite search terms maintained within the CPU 12) may recognize "hotel" as an indefinite search term that needs further defining attributes (e.g., a context).

In response, the CPU 12 may query the searcher as to a context of the search. The searcher may respond "I am in Hawaii for a convention." is the context. The CPU 12 may parse the response into the words "Hawaii" and "convention" as contexts, which impart further meaning to the search term "hotel".

Once attributes are identified, a searcher may then be asked to determine 108 whether the attribute can be mathematically defined. For example, where the search is for airline tickets, the attribute may be a price that a buyer may be willing to pay for the ticket. The buyer may also need to determine 110 a maximum (e.g., threshold value) price which he may not want to exceed. Alternatively, the buyer may also have a lower threshold price for tickets that he may not wish to consider for other reasons.

Alternatively, it may be possible to attach 106 a subjective weight to an attribute. Subjective weights may be any arbitrary number, that for descriptive purposes may be chosen to be anyplace between −10 and 10. For example, in the analogy of the airline ticket, the use of a subjective weighting factor may be used to sort and exclude records of airplane tickets offered on a standby basis or using connecting flights.

Attributes of a search term or terms may be extended to any level based upon the imagination of the searcher. Moreover, multiple levels of search terms and/or attributes of the search terms can be used. Subjective as well as mathematical limits may be associated with attributes.

Under the embodiment, the steps of FIG. 2 may be repeated until a set of search vectors are identified. Once the vectors are defined, the search application 28 packages the search agent 30 for export to a web site (e.g., 20). Where the destination web site lacks software support for search agents, the originating website 12 may include an executable code with (or as part of) the agent 30. Where the destination website has software support for a search agent 30, the search agent 30 may include a preformatted set of search terms and attributes of those terms.

FIG. 4 depicts a format that may be used by a software agent 30. The agent 30 may generally include a header 32 and one or more search vectors 34, 36, 38. For a simple search, a single search term and associated attributes of that term may provide adequate results. Adequate results may be defined by a search result criteria 40 included with the search agent 30. A search criteria may include any measurable criteria indicative of a successful search. For example, the search criteria may specify a minimum and maximum number of records for a successful search. The minimum number records may be as low as one, or as high as what the searcher may consider practical in view of the subject matter of the search.

Further the search criteria 40 may be used as a means of directing and controlling execution of the search vectors 34, 36, 38. For instance, if the number of search records identified by the first search vector 34 meets the search criteria (e.g., the number of records is between the minimum and maximum), then the search agent 30 may not execute subsequent search vectors 36, 38. Alternatively, if the first search vector 34 meets the search criteria, then the second and third search vectors 36, 38 may be executed as independent searches.

In general, where the first search vector 34 results in too many records, then the search agent 30 may cause the second search vector 36 to be executed. The second search vector may be applied to limit a set of files identified by the first search vector. If the second search vector 36 still returns too many records, then additional search vectors (e.g., 38) may be executed. Upon completion of execution of the search vector 30 and where the search results meet the search result criteria, the search agent 30 may automatically return the search results to the CPU 12 of the searcher.

Activation of a search agent 30 may occur in conjunction with the browser 14 of the CPU 12 of the searcher. The searcher may sign-on to the internet as under the prior art and may connect to a website (e.g., website 20 in CPU 18) also as under the prior art. The website 20 may be a search engine or an information resource maintained by a public or private organization.

Once connected to a website 20, the search agent 30 may be uploaded by a search agent upload facility associated with the browser 14 or by entry of an agent identifier into a search term window of the webpage presented on the display 26 of the searcher. Entry of the identifier of the agent 30 into the search term window causes an exchange of information between the search application 28 and browser 14 and, ultimately, transfer of the essential features of the agent 30 to the browser 14. Upon receipt of the essential features of the agent 30, the browser is free to complete the transfer of the agent 30 to the searched website 20.

Once uploaded to the website 20, the agent 30 may identify itself to the website 20 by an agent ID 42 and searcher ID 44. The agent ID 42 may be used by the website 20 as a means of knowing whether the agent 30 is compatible with its operating system and current version software. The searcher ID 44 may be used by the website 20 as a security feature and a means of knowing that it is dealing with an authorized searcher (e.g., someone who has paid for the privilege of using search agents).

Figure 3:
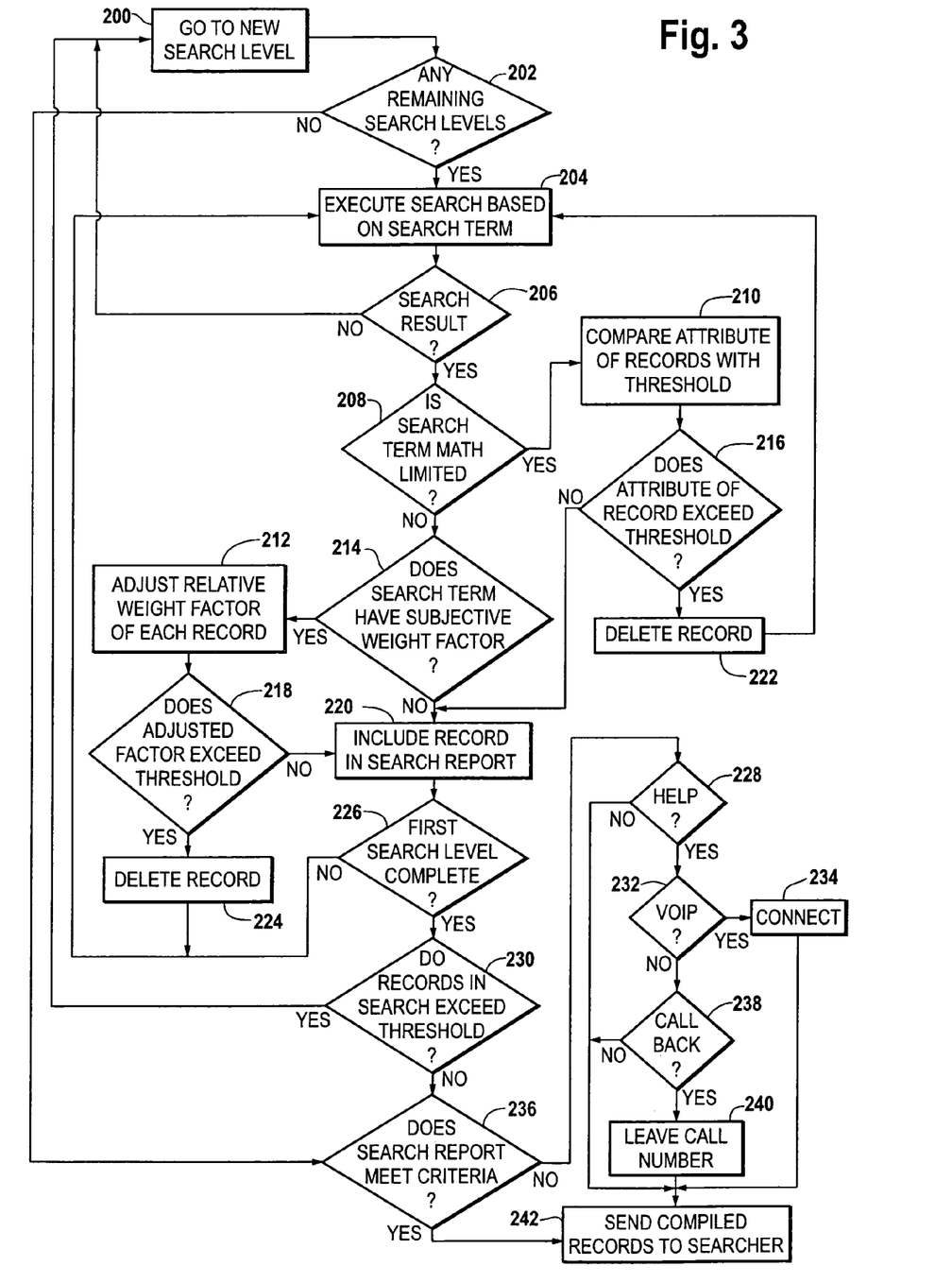
FIG. 3 depicts a flow chart for processing the search agent at a website of the system of FIG. 1.

Once uploaded to the searched website 20, the agent 30 may execute and search a database 19 based upon the search vectors 34, 36, 38 of the agent 30. FIG. 3 depicts a flow chart that may be used by the agent 30 during execution. As shown, the agent 30 may go 200 to a search level and execute 204 a search based upon a term found at that level. If the search term fails to find any records 206, the agent 30 may go to a new search level and repeat the search using a different search term.

If the search produces a search result, the agent 30 determines whether the search term has any associated attributes and whether the attribute is mathematically limited. Where the mathematical limitation is something associated with cost, the agent 30 may search the file for numbers preceded with a dollar sign, as a means of identifying the limiting attribute.

In the case of real estate files at a website 20 providing a series of multiple listing services (MLS) files, the limiting attribute may be a cost of a house being offered for sale. A searcher may use a search term of "houses" or "real estate" as a search term for locating the MLS files. A mathematically limited attribute of the MLS files may be an asking price of the house.

The search may be simplified by the fact that MLS listings typically follow a common format with house prices appearing along a top line of the listing. Alternatively, real estate files typically only contain one dollar value with an appropriate number of digits (e.g., 5, 6, or 7 digits) denoting a price of the house. Consequently, the search agent 30 would be able to identify a housing price by a prior knowledge of the file structure or by analyzing an ASCII string making up the file. Upon analyzing each file the search agent 30 would only return MLS files containing houses in the correct price range.

Further, mathematical attributes may have threshold values associated with the attribute. For example, a searcher may specify a threshold limit on either side of the desired number of the mathematical attribute for identification of files to be included in the search result. To determine whether a file is to be included in the search report, the mathematical attribute is compared 210 with the threshold value. If the attribute exceeds 216 the threshold value, the file is deleted 222. If the attribute does not exceed the threshold, then the file is included 220 in the search report.

The agent 30 may contain numerous mathematical attributes, each with its own threshold. For example, the agent 30 directed to MLS listing for houses may contain an attribute directed to real estate taxes. The attribute may contain a threshold value for deletion of a file with taxes which are too high or low. The agent 30 may differentiate a tax field of the MLS file from other price quantities (e.g., utility costs) by a prior knowledge of the file structure or by the fact that the dollar value for taxes is often preceded by the letters "TX".

Search terms may also include subjective attributes, that may be used as a cumulative measure of desirability of the search record. The cumulative nature of subjective attributes may be measured by appending a cumulative data field to the file and adjusting a number within the cumulative field based upon each subjective comparison.

For example, where a subjective index has values of from +10 to −10 (with the least desirable value of −10) the threshold for retaining a record may be that the value in the cumulative field remain above the level of zero. During a first pass each record may assume a value of zero. During comparison with each subsequent subjective attribute, the cumulative value may be adjusted based upon the subjective weight given by the searcher to that subjective attribute.

In the MLS listing analogy, the searcher may include a subjective attribute with a value of 8 for listings found within a certain preferred city. The search may also include a subjective attribute with a value of −9 for listings within a particular school district of that preferred city.

During the first pass (where the subjective attribute is for a record in the preferred city), the initial cumulative value for a record of a listing within the preferred city may be adjusted 212 upwards by summing the subjective weight and the cumulative value to provide an adjusted cumulative value of 8 at the end of the first pass. At the end of the first pass the record would be included 220 in the search report.

During the next pass (where the subjective attribute is school districts), if the listing where in the preferred city and in the school district with a subjective rating of −9, the cumulative value would be added to the subjective rating to provided an adjusted value of −1. Since the cumulative value is now a minus value, the record would now be deleted from the search report at the end of the second pass.

At the end of a first search level, the search agent 30 would determine the number of records in the search report. if the number exceeded some arbitrary minimum threshold value, the search agent 30 would go to the next search level 200 and continue to process search terms, either until all the search terms have been processed or until the number of records is below the minimum threshold.

When all the search terms have been processed 202, or the number of records is below some threshold 230, a comparison is made to determine whether the search report meets 236 the search criteria. The search report may not meet the search criteria because there are too many or too few records in the search report. Where the search report meets the search criteria, the search report may be sent 242 to the searcher.

Where the search report does not meet the search criteria, the searched site may return a help query 228 to the searcher at the searching terminal 12. The help query may be in the form of a summary search report webpage showing the reason why the search report did not meet the search report criteria. Where the search report included too many records, the query may show the number of records found and the maximum records permitted by the search criteria. Similarly, where the search report contains too few records, the query may include indication of the number of records found.

In addition to showing why the search result did not meet the search criteria, the query webpage may offer the searcher help 232 by activation of an appropriate icon. If the searcher should decide that he does not want help, then he may elect to refuse help. Activation of the icon refusing help may cause a message to be sent back to the website 20 indicating a refusal. In response, the searcher may be presented with an icon indicated the size of the search record as developed and the opportunity to download all or a portion the search report.

Alternatively, the summary search report may provide the searcher with a set of icons on the display 26 by which the searcher may accept the offer of help in the form of either a VOIP voice connection or a telephone call-back from an agent of the website. The VOIP voice connection may be used to connect the searcher to a person (not shown) who is familiar with the website 20 and who may be able to provide the searcher with assistance in executing a more effective search.

To accept help, the searcher may select the icon requesting an immediate audio connection with a human agent or the call-back message to be returned later from an agent of the searched website 20. Where the searcher selects the call-back icon, the searcher may be asked to enter a call-back telephone number. Upon entering a telephone number, the number is transferred back to the website 20. The searcher may then download the search report from the website 20.

Where the searcher selects the audio connection 232, the CPU (e.g., 18) activates the VOIP application 21. Activation of the VOIP application 21 establishes an audio connection between a telephone 15 of the website agent and a telephone 11 of the searcher.

The VOIP application 21 of the CPU 18 may be used to exchange audio information between a telephone 15 of the website agent and the searcher through the internet connection with the searcher. Similarly, the VOIP application 13 of the searcher CPU 12 allows audio information to be exchanged between a telephone 11 of the searcher and agent of the website 20 through the internet connection.

Concurrent with the exchange of audio information between the searcher and agent, the CPU 12 of the searcher and the CPU 18 of the website 20 may also exchange data. The website 20 may download the search results to the CPU 12 of the searcher and also to the terminal 17 of the agent. The website 20 may also transfer a copy of the software agent 30 to the agent of the website 20 for review.

With a copy of the search results and search agent 30 displayed before both the searcher and website agent, the searcher and website agent may discuss the results of the search. The website agent may provide suggestions to the searcher as to how to modify the search agent 30 to improve performance. Upon viewing the search results, the website agent may also explain the search results to the searcher. Further, the agent 15 can also be used to guide domain searches.

As a further aid to a user, the search engine 23 may also allow the website agent to provide a profile of databases. The profile may include one or more itineraries.

Under another illustrated embodiment, the search engine 23 of the CPU 18 or agent 15 may propose an itinerary for the search based upon the search terms and any attributes. Where the search engine 23 proposes the itinerary, the search engine 23 may function as a replacement for a live agent 15 with assistance from an appropriate help resource (e.g., CC Studio).

As used herein, an itinerary is a list of databases that may be relevant to a search term and its attributes. The databases may be directed to a single domain or to multiple domains based upon the search term and its attributes. As used herein a domain refers to a database which relates to a particular subject matter or grouping of subject matter.

The searcher may either accept or reject the itinerary. If the searcher accepts the itinerary, the itinerary may be routed to the search engine 23, 29 along with the agent 30.

The proposed itinerary may be based upon any of a number of criteria. For example, where the search term and attributes relate to a particular brand name product sold elsewhere, the search engine 23 or agent 15 may propose an itinerary of competing products sold through the website 20 or those websites (not shown) of business affiliates. The itinerary may also include products which are typically purchased along with the brand name product as part of an upselling opportunity.

Under another illustrated embodiment of the invention, the CPU 18 may track unsolvable queries (those searches which did not result in identified records). The unsolvable searches may also be routed to an agent 15.

Statistics on unsolvable searches may be used as an indication of which areas of the website 20 need development. The statistics on unsolvable searches may be monitored and a list of frequently executed searches (i.e., frequently asked questions (FAQs)) maintained.

The search engine 23 may also track the itineraries which result in sales and use those itineraries as proposed itineraries for future search requests. Further, subsequent searches may use the itineraries for fast searches of domain specific issues. The FAQs and itineraries may also be used to guide processing of domain specific handling of calls, knowledge, etc.

Under another illustrated embodiment, agents 15 with a knowledge of FAQs may interact with and assist callers with similar questions. Such interactions may be useful in helping the searcher build domain specific queries based upon automated or guided query building methods.

In building a user specific knowledge base, a user proxy may be maintained so that routine tasks (or itineraries) which the call center has assembled previously may be automatically provided to the searcher to ensure that the searcher does not have to relearn that which is already known or require the need to rebuild known itinaries. The may be done by memorizing FAQs and tracking the database which provided the greatest number of "hits" or in the case of a merchandising call center, the number of purchases.

Under another embodiment of the invention, the agent 30 may contain provisions for cloning itself where the search results point to another website. This feature may be useful where the searched website 20 is a search engine 23. In this situation, the search engine 23 functions as a path to domain specific searches, thereby functioning to improve the effectiveness of the query.

In this case, a search vector 34, 36, 38 may be structured to recognize web addresses returned by the search engine 23 as part of an initial search result. Where a valid web address is detected in a search result, the agent 30 may duplicate itself for transfer to the recognized web address.

Where the search term and its attributes results in the generation of a search itinerary, the cloning of the agent 30 may result in the clones 30 being sent to other secondary search engines for domain specific searching. Once difference, however, is that the clones 30 are typically limited to a single destination search engine (i.e., the clones do not themselves generate further itineraries).

The generation of clones 30 results in a communication and exchange of information among search engines. The coordination of searches among search engines results in a vast increase of search results than would otherwise by achieved through the use of a single search engine.

Further, the original search engine (e.g., CPU 18) and agent 30 function to receive search results from the clones 30. Upon receiving search results from the clones 30, the CPU 18 functions to collate the search results from the clones 30 and transmit the collection of search results to the searcher CPU 12.

Further, the use of clones 30 may trigger a language translator (LT) application 25 residing upon secondary search engines. The use of the LT allows English language queries and results to be translated into a language neutral meta language for use with non-English databases.

Under another illustrated embodiment, e-mail messages are received by the CPU 18 from users and analyzed for search terms and attributes of the search terms. The e-mail messages are parsed by a e-mail analyzer (e.g., Brightware) for key words. The key words are used to compose a search agent 30 which may then be routed to a domain specific search engine 23, 29. The search engine 23, 29 performs a search and returns a set of results to the CPU 18, which in turn composes a response to the e-mail sender including the search results.

Specific embodiments of methods and apparatus of providing an internet search agent according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of obtaining information over the Internet, such method comprising the steps of: uploading a search agent that includes a plurality of search vectors and a search criteria through the Internet from a browser within a searching terminal to a website to be searched; executing a set of uploaded steps of a first search vector of the plurality of search vectors of the search agent at the website to provide a first search result that includes a first set of of identified files; determining whether the first set of identified files meets the search criteria; when the identified files does not meet the search criteria, executing a set of uploaded steps of a second search vector of the plurality of search vectors to provide a second search results that includes a second set of files; and downloading the first search result to the browser within the searching terminal when the first set of identified files meets the search criteria, otherwise, automatically downloading the second search result to the browser within the searching terminal.

2. The method as in claim 1 further comprising including at least one program steps within the search agent.

3. The method as in claim 1 further comprising including a search term within the search agent.

4. The method as in claim 3 further comprising including a context of the search term within the search agent.

5. The method as in claim 1 further comprising translating the search term and attribute into a meta language.

6. The method as in claim 1 further comprising collecting for later analysis unsolvable queries relating to the search agent within the website to be searched.

7. The method as in claim 1 further comprising proposing an itinerary for the search agent to the searching terminal.

8. The method as in claim 1 further comprising building a domain specific query based upon the search agent.

9. The method as in claim 1 further comprising connecting a searcher of the searching terminal to a person who is familiar with the web site to be searched using a voice over Internet protocol connection to provide a voice connection between the searcher and the person so that the person can assist the searcher in executing a more effective search.

10. The method as in claim 1 further comprising providing a user proxy as an itinerary for the search agent.

11. The method as in claim 1 further comprising intercepting the search agent on a webpage and substituting specific or marketing directed alternatives.

12. The method as in claim 1 further comprising correlating search results for presentation to a searcher of the search terminal.

13. The method as in claim 1 further comprising parsing e-mail messages into search agents.

14. The method as in claim 1 further comprising using a live agent of the searched website to guide domain specific searches.

15. The method as in claim 1 further comprising defining a profile for search agents from the search terminal.

16. The method as in claim 1 further comprising forwarding an itinerary to a host for completion.

17. The method as in claim 1 further comprising substituting a search engine for providing help to a searcher of the search terminal.

18. The method as in claim 1 further comprising using a search engine as a directory to domain specific searching.

19. The method as in claim 1 further comprising identifying a web site.

20. The method as in claim 19 wherein the step of identifying the web site further comprises connecting to a search engine of the identified website.

21. The method as in claim 20 further comprising determining that the search result is another website.

22. The method as in claim 21 wherein the step of determining that the search result is another website further comprises uploading the agent to the other website.

23. The method as in claim 22 wherein the step of uploading the agent to the other website further comprises uploading the agent directly from the search engine to the other website.

24. The method as in claim 1 wherein the step of executing the uploaded steps at the website to provide a search result further comprises comparing an element of a record of the search result with a search term threshold value.

25. The method as in claim 24 wherein the step of comparing a record of the search result with a search term threshold value further comprises deleting the record from the search result when the element of the record exceeds the search term threshold value.

26. The method as in claim 1 wherein the step of executing the uploaded steps at the website to provide a search result further comprises matching an element of a record of the search result with a search term template.

27. The method as in claim 26 wherein the step of matching a record of the search result with a search term template further comprises deleting the record from the search result when the element of the record fails to match the search term template.

28. The method as in claim 25 wherein the step of matching a record of the search result with a search term template further comprises retaining the record within the search result when the element of the record substantially matches the search term template.

29. Apparatus for obtaining information over the internet, such apparatus comprising:
   means for uploading a search agent that includes a plurality of search vectors and a search criteria through the internet from a browser within a searching terminal to a website to be searched;
   means for executing a set of uploaded steps of a first search vector of the plurality of search vectors of the search agent at the website to provide a first search result that includes a first set of files;
   means for determining whether the first set of files meets the search criteria;
   means for executing a set of uploaded steps of a second search vector of the plurality of search vectors to provide a second search result that includes a second set of files when the first set of files do not meet the search criteria; and
   means for automatically downloading the first search result to the browser within the searching terminal when the first search result meets the search criteria and, otherwise automatically downloading the second search result to the browser within the searching terminal.

30. The apparatus as in claim 29 wherein the means for uploading the plurality of program steps further comprises means for including at least one search terms among the uploaded program steps.

31. The apparatus as in claim 29 further comprising means for identifying a web site.

32. The method as in claim 29 wherein the means for identifying a web site further comprises means for connecting to a search engine.

33. The apparatus as in claim 32 further comprising means for determining that the search result is another website.

34. The apparatus as in claim 33 wherein the means for determining that the search result is another website further comprises means for uploading the agent to the other website.

35. The apparatus as in claim 34 wherein the means for uploading the agent to the other website further comprises means for uploading the agent directly from the search engine to the other website.

36. The apparatus as in claim 29 wherein the means for executing the uploaded steps at the website to provide a search result further comprises means for comparing an element of a record of the search result with a search term threshold value.

37. The apparatus as in claim 36 wherein the means for comparing a record of the search result with a search term threshold value further comprises means for deleting the record from the search result when the element of the record exceeds the search term threshold value.

38. The apparatus as in claim 29 wherein the means for executing the uploaded steps at the website to provide a search result further comprises means for matching an element of a record of the search result with a search term template.

39. The apparatus as in claim 38 wherein the means for matching a record of the search result with a search term template further comprises means for deleting the record from the search result when the element of the record fails to match the search term template.

40. The apparatus as in claim 38 wherein the means for matching a record of the search result with a search term template further comprises means for retaining the record within the search result when the element of the record substantially matches the search term template.

41. Apparatus for obtaining information over the Internet, such apparatus comprising: a search agent comprising a plurality of search vectors and a search criteria which is uploaded through the Internet from a browser within a searching terminal to a website to be searched; a website processor which executes a set of uploaded steps of a first search vector of the plurality of search vectors of the search agent at the website to provide a first search result that includes a first set of identified files; said website processor being further adapted to execute a set of uploaded steps of a second search vector of the plurality of search vectors to provide a second search result that includes a second set of identified files when the first set of identified files do not meet the search criteria; and a communication processor which automatically downloads the first search result to the browser within the searching terminal when the first search result meets the search criteria and, otherwise automatically downloading the second search result to the browser within the search terminal.

* * * * *